INVENTOR.
JOHN L. STEWART
BY
Meyers & Peterson
ATTORNEYS

INVENTOR.
JOHN L. STEWART

June 13, 1967     J. L. STEWART     3,325,597
SOUND ANALYZING SYSTEM
Filed Sept. 20, 1963

INVENTOR.
JOHN L. STEWART
BY
Meyers & Peterson
ATTORNEYS

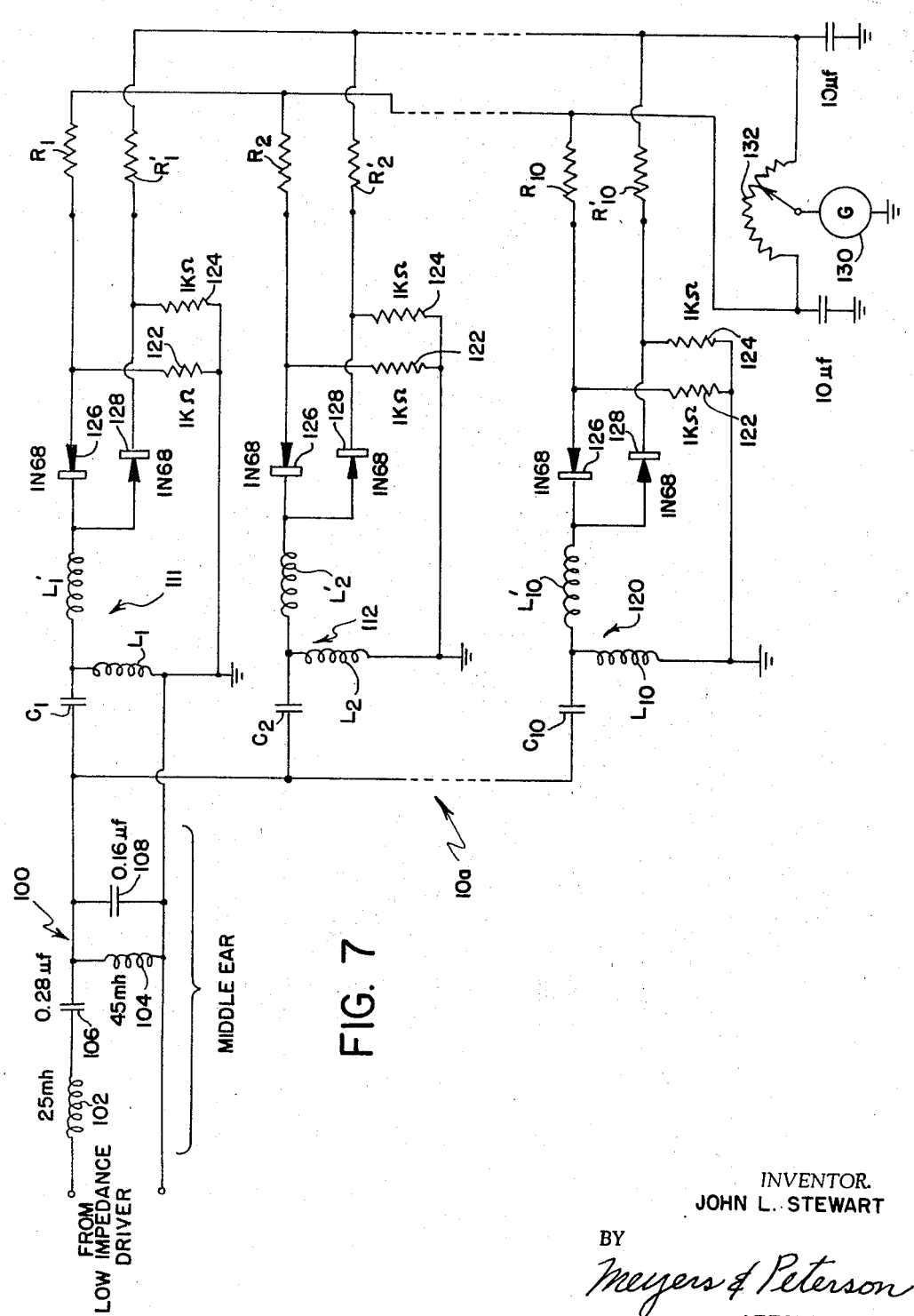

United States Patent Office 3,325,597
Patented June 13, 1967

3,325,597
SOUND ANALYZING SYSTEM
John L. Stewart, Menlo Park, Calif., assignor to Santa Rita Technology, Inc., Menlo Park, Calif., a corporation of Arizona
Filed Sept. 20, 1963, Ser. No. 310,394
12 Claims. (Cl. 179—1)

ABSTRACT OF THE DISCLOSURE

Sound is delivered to an electronic analog ear. Voltage signals derived therefrom form an envelope representative of the sound. The sound is analyzed via output voltage signals indicative of the area under the envelope and its centroid, although other pattern measures can be obtained when the study of the sound so requires.

---

This invention relates generally to sound analyzing systems, and pertains more particularly to an electronic system having especial utility in the study of speech and hearing.

While reliable analyzing procedures are desired in many areas where sound is involved and is to be investigated, accurate analysis is extremely important in the study of speech and hearing problems. Accent alone is a complex segment of speech study, for accent can be interpreted in very general terms to include regional and personal characteristics, proper and improper speech, energetic and lazy speech, whispered and glottal speech, etc. With the envisaged system, instances of improper speech become evident even though not always apparent to the casual observer.

Accordingly, one object of the invention is to provide a system for studying individual sounds and for providing accurate clues or indications as to when a given sound differs from one considered generally acceptable. More specifically, the recognition of why one sound may differ from another provides a medium for assisting those persons interested in improving their speech. In this regard, the invention will be useful in speech training of both normal and deaf persons.

Another object of the invention is to provide a person with means by which he can train himself to speak better through a trial and error process, the contemplated system providing a visual indication of when the proper sound is produced. Consequently, the individual can vocalize in various ways until he has accomplished a certain goal, such goal being evidenced by a simple meter reading which indicates that either corrrespondence with a desired or standard sound has been attained or that further effort should be devoted to the realization of such a given sound.

One specific object of the invention is to provide a basic device and ancillary indicating means with which centroid and other pattern measures may be studied and measured. For a sustained sound, the centroid becomes the most important single comparative measure of sound quality. However, another important general measure for the case of cochlear patterns in hearing is the area of the spatial pattern that is produced when practicing the present invention and is readily obtained with a system constructed in accordance with the teachings of the present invention. Still further, another important measure is the pattern width and a fourth measure is the asymmetry of the pattern about the center of balance. The study of all of these characteristics can be facilitated when utilizing the present system.

So as to give some notions as to the significance of the various pattern measures, it suffices to say that pattern area is related to the loudness of a sound, where loudness is a subjective measure. Furthermore, the centroid is related to a kind of weighted average frequency of a sound, which bears some correspondence with the subjective measure of pitch. Pattern width relates partly to sound roughness or brilliance. It will in any event be understood that pattern measures may not have direct correspondences with classical measures as employed by psychologists and others.

A further object of the invention is to provide a system that is considerably more simple than that of the spectrum analyzer that has heretofore been employed in the interpretation of sound patterns. The following factors are of major significance with respect to data simplification as achieved with my analyzer: (1) the frequency bands in the apparent system have center frequencies which are distributed as the logarithm of frequency; (2) all bands have the same center-frequency-to-bandwidth ratio; (3) the frequency bands are highly asymmetrical; (4) they are extensively overlapping; and (5) the electric signal which represents mechanical motion undergoes averaging-type detection. These five factors combine to cause the present system to directly display differential masking, monaural diplacusis, and other well-known psychoacoustic phenomena.

Quite briefly, the invention includes means for converting a sound into an input electrical signal. The electrical signal is then transmitted to a converting means that comprises an array of stations simulating various spaced points along the basilar membrane of an animal cochlea for the purpose of providing a plurality of output electrical signals at the stations which are representative of motions of the spaced points along the basilar membrane. These output electrical signals are in turn converted into voltage signals having relatively slowly varying waveforms. These voltage signals are then summed with various weightings and an appropriate visual signal is provided in accordance with the summed signal.

These and other objects and advantages of this invention will more fully appear from the following description, made in connection with the accompanying drawing, wherein like reference characters refer to the same or similar parts throughout the several views and in which:

FIGURE 7 is a detailed circuit which accomplishes the more important functions of the generalized system in FIGURE 1 and which can replace FIGURE 1 in its entirety.

Figure 1:
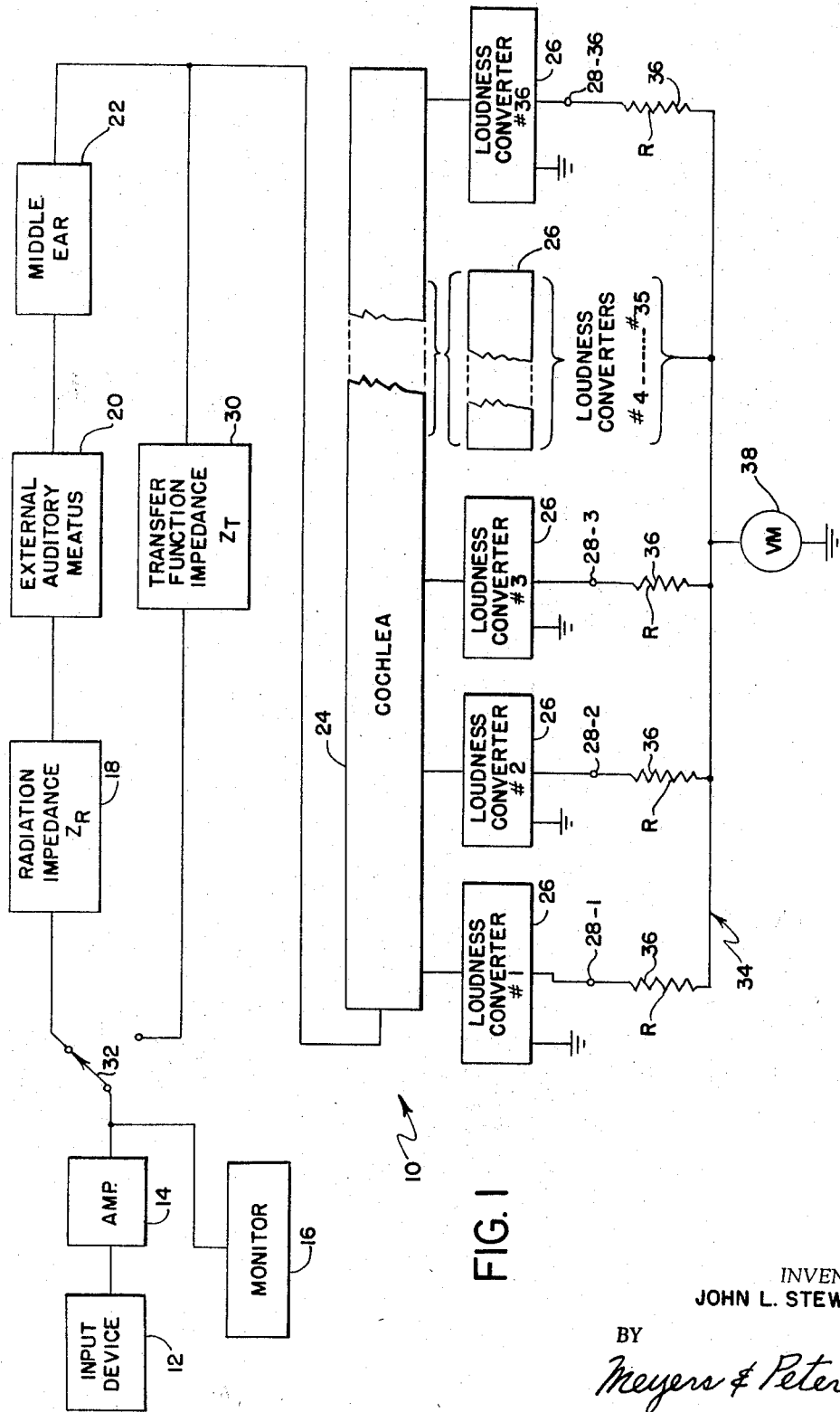
FIGURE 1 is a schematic diagram, largely in block form, illustrating one rather simplified embodiment my invention may assume.

One of the features of the present invention is that use can be made of an electronic analog ear that has been described and claimed in a patent application filed Dec. 19, 1962, Ser. No. 243,697, now Patent No. 3,294,909, by William F. Caldwell, Ewald Glaesser and John L. Stewart, the last-mentioned of these inventors being the present applicant; reference may be made to the foregoing patent for details not herein explained. However, the electronic analog ear has been denoted in its entirety in FIGURE 1 by the reference numeral 10. The electronic analog ear 10 includes an input device 12, such as a microphone or tape deck, which serves as a means for delivering an appropriate transduced sound that is to be analyzed by the present system, the transduced or converted sound being fed to an audio amplifier 14 capable of raising the electrical signal to a level sufficient to drive the analog ear. If desired, a monitoring device 16 can be connected to the output side of the amplifier 14, which device may assume the form of a speaker or an oscilloscope.

A block 18 denotes the radiation impedance which results from the effects of the head and pinna. While the employment of the analog radiation impedance is descretionary, depending to some extent upon the type of study being conducted and the refinement of analysis, this impedance simply constitutes a series RC circuit that has been shown in more detail in my previously filed application in which I am a coinventor.

A human external auditory meatus is a tube having an average length of 2.7 cm., an area of 0.3 to 0.5 sq. cm., and is terminated by the tympanic membrane. The meatus is denoted in FIGURE 1 by the reference numeral 20 and is modeled on a direct analog basis by assuming it to be a uniform tube in which plane waves exist and in which friction effects at the walls are negligible. The electrical model of the meatus 20, therefore, consists of a lumped parameter, uniform, lossless transmission line having certain typical values as set forth in my foregoing patent.

As for the middle ear, it is presumed to consist of the tympanic membrane which terminates the external meatus, the middle ear cavity, ossicles (malleus, incus, and stapes) which are enclosed in the cavity and which serve to transmit motions of the tympanic membrane to the cochlea or the inner ear, and the oval and round windows which close the openings to the cochlea. The block 20 denoting the middle ear is modeled by assuming an idealized linear mechanical-acoustical configuration and realizing this configuration with electrical components, all this being shown in my foregoing patent.

Next to be referred to is the analog cochlea which has been generally designated by the reference numeral 24. The cochlea 24 comprises various impedance sections which are representative of various spaced points along the basilar membrane of the human cochlea where mechanical motions occur. For instance, the spacing denoted by each impedance section can be considered to be indicative of an element having a length equal to approximately one millimeter. As pointed out in my foregoing patent, thirty-six impedance sections are employed, although such a number is, of course, susceptible to variation. The thirty-six sections that are herein alluded to constitute a tapered RLC wave propagating structure, producing voltages at thirty-six points therealong which represent displacement or velocity or acceleration of points along the basilar membrane. The desired voltages are amplified, detected and filtered with thirty-six loudness converters labeled 26, each representing the neural structure for about one millimeter along the axis of the cochlea duct. Stated somewhat differently, the neural structure of the cochlea and of auditory portions of the central nervous system is modeled functionally by means of the loudness converters 26. More specifically, the detection role played by the loudness converters represents the conversion of mechanical excitation to the neural equivalent of the mechanical excitation (which is presumed to be the summation of a large number of individual neural pulses so that the resulting or built-up waveform is continuous as a good approximation). The output voltages from the loudness converters 26, which are caused to be slowly variant by virtue of the filtering action, form a spatial pattern of importance with respect to the cortical function of recognition. Each loudness converter 26 is provided with an output terminal. These terminals are collectively identified by the reference numeral 28 but to facilitate subsequent reference thereto each terminal has been distinguished from the other in a simple and straightforward fashion. In this regard, the terminal associated with loudness converter #1 has been identified by the reference numeral 28-1, loudness converter #2 by the reference numeral 28-2, loudness converter #3 by the reference numeral 28-3, and so on through loudness converter #36 whose terminal has been identified by the reference numeral 28-36, although the intermediate converters and terminals have not been pictured because of the limited amount of drawing space.

For study of cases where the direct analogs of the outer and middle ears are not required, the units 20 and 22 (and the unit 18) can be replaced with a single unit which models these portions of the ear on a functional basis so as to provide substantially correct transfer function. This unit has been simply called a transfer function impedance in FIGURE 1 and has been assigned reference numeral 30. A switch 32 permits its substitution for the units 18, 20 and 22.

Although the goal to be achieved will not be immediately perceptible, attention is directed at this time to a passive resistance network denoted generally by the reference numeral 34 in FIGURE 1. The network 34 includes one resistor 36 for each loudness converter 26, being connected to the various terminals 28 as clearly pictured. If the loudness converter #1, which has the output terminal 28-1 attached thereto, is producing a voltage $V_1$, the next loudness converter voltage $V_2$ at its terminal 28-2, the next converter voltage $V_3$ at its terminal 28-3 and so on to the last loudness converter, whether it be 36-1 or whatever the number of converters actually utilized, then the summed voltage $$V_T = (V_1 + V_2 + V_3 \ldots V_N)/N$$

where N equals the total number of loudness converters 26. $V_T$ is the voltage measured by a voltmeter 38.

Figure 2:
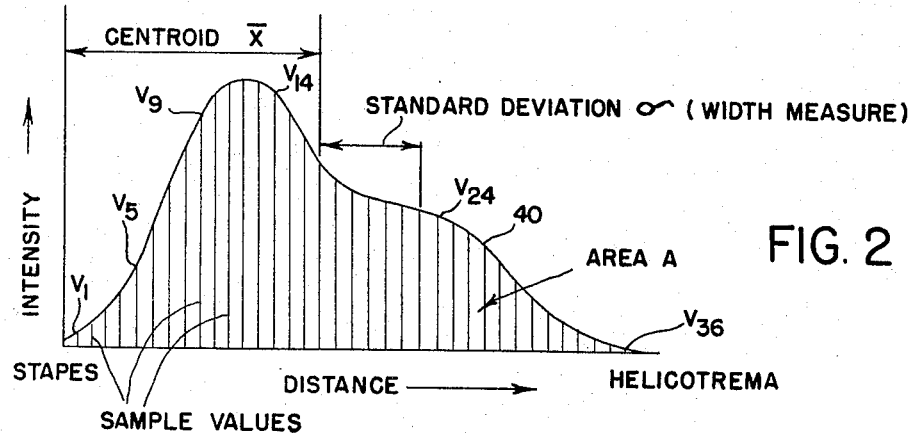
FIGURE 2 is a spatial pattern or curve representative of one typical sound that is to be studied and analyzed.

To assist in understanding the role played by the passive resistance network 34, reference will now be made to FIGURE 2 where a generalized spatial pattern 40 has been graphically presented. The pattern 40 is representative of a given sound that is delivered to the analog ear 10 via the input device 12. Letting $V_1$, $V_2$, $V_3$ ... $V_N$ be representative of the voltages appearing at the terminals 28, a plot of these voltages versus distance defines the pattern 40 in terms of sample points as represented in FIGURE 2. This pattern 40 may be defined in terms of mechanical-like parameters. Thus, the envelope constituting the pattern 40 has merely been drawn along a path determined by the various voltages existing at the outputs of the loudness converters 26, the specific number being 36 in this particular instance. Consequently, the previously alluded to voltage $V_T$ is representative of the area of the pattern 40 and this area is measured continuously on a time basis, it being only necessary to observe the particular reading on the voltmeter 38.

Figure 3:
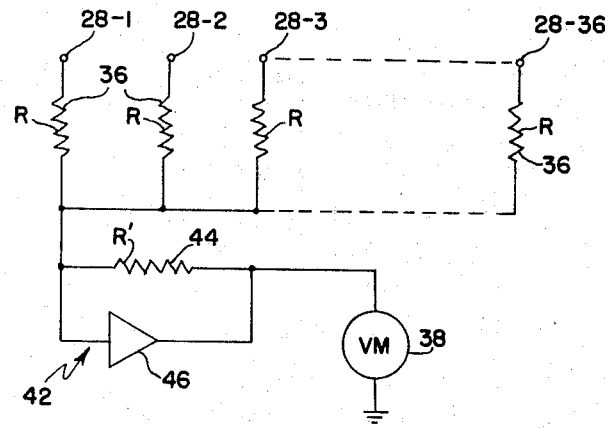
FIGURE 3 is a schematic diagram that can be substituted for a portion of what has been illustrated in FIGURE 1.

Instead of the network 34, the circuit indicated generally by the reference numeral 42 in FIGURE 3 may be substituted therefor. The circuit 42 includes various resistors 36, which have previously been indicated as all being of the same value, plus a resistor 44 having a value R' in parallel with an analog computer summing amplifier 46. In this situation, the measured voltage $$V_T = R'(V_1 + V_2 + V_3 \ldots V_N)/R$$

While the circuit 34 or the circuit 42 when used in conjunction with the analog ear 10 provides a measurement in accordance with the area of the pattern 40, it is possible to provide an indication of the centroid of this particular pattern 40, which is quite important in the study of sound quality, the centroid becoming the most important single comparative measure of sound quality for sustained sound. The comparative "centroid" is defined in the usual manner and corresponds to the center of gravity of the area of the pattern 40. If the pattern 40 were cut out to form a card in the shape that it represents, then the centroid would be the point at which the card would balance.

The centroid can be considered as being located at distance $\bar{x}$ from the "stapes" end of the pattern 40.

Figure 4:
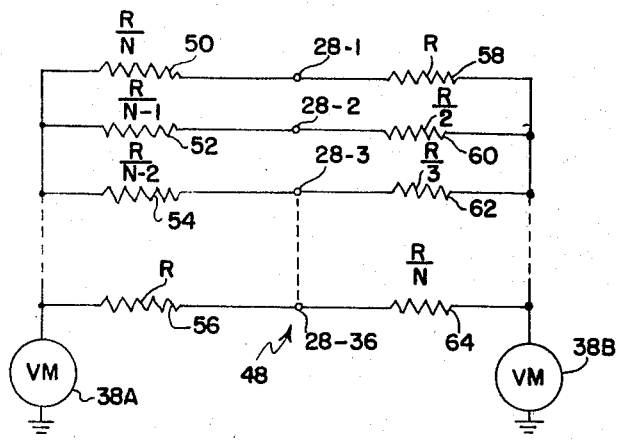
FIGURE 4 is another schematic that can be utilized in connection with what has been depicted in FIGURE 1.

If the resistor network 34 of FIGURE 1 or that of FIGURE 3 is tapered linearly, the summed voltage is proportional to the centroid value. A circuit 48 has been depicted in FIGURE 4 for the purpose of determining centroid values. It will be observed that this circuit 48 is comprised of resistors 50, 52, 54 and 56 connected to the various terminals 28 and additional resistors 58, 60, 62 and 64 are also connected to these terminals. The resistor 50 has a value equal to $R/N$, the resistor 52 equal to $R/(N-1)$, the resistor 54 a value corresponding to $R/(N-2)$ and the resistor 56 having a value equal to R. Similarly, the resistor 58 has a value equal to R, the resistor 60 a value equal to $R/2$, the resistor 62 equal to $R/3$ and the resistor 64 equal to $R/N$ where N is the number of loudness converters 26 that are utilized. If the centroid is measured from the left side of FIGURE 2, then the resistor array at the left of FIGURE 4 will suffice; if it is measured from the right side of the pattern 40 in FIGURE 2, then the right in FIGURE 4 is proper. If L is the total pattern width and $\bar{x}$ is the centroid distance measured from the left edge of the pattern, then naturally $L-\bar{x}$ is the centroid distance measured from the right hand side. As with FIGURE 3, it is to be understood that active summing can be used in FIGURE 4.

It cay be noted that the voltage measured by the voltmeter 38A at the left can be considered to be $V_A$ and the voltage measured by the voltmeter 38B at the right in FIGURE 4 is to be considered as $V_B$. The sum of these voltages, $V_A+V_B$, is proportional simply to area as in the case of network 34 or 42. However, the difference between $V_A$ and $V_B$, $V_A-V_B$ is proportional to the centroid measured from the center of the pattern: $V_B-V_A \propto (L-2\bar{x})$ times the area.

If we let $V_A$ be multiplied by a coefficient $k(0 \leq k \leq 1)$ and $V_B$ by a coefficient $(1-k)$, then $$V_B \cdot (1-k) - V_A \cdot (k)$$

and if we adjust $k$ to give zero voltage difference, we evaluate normalized $\bar{x}$ (as $\bar{x}/L$), in terms of $k$:

$$\bar{x}/L = 1-k$$

Figure 5:
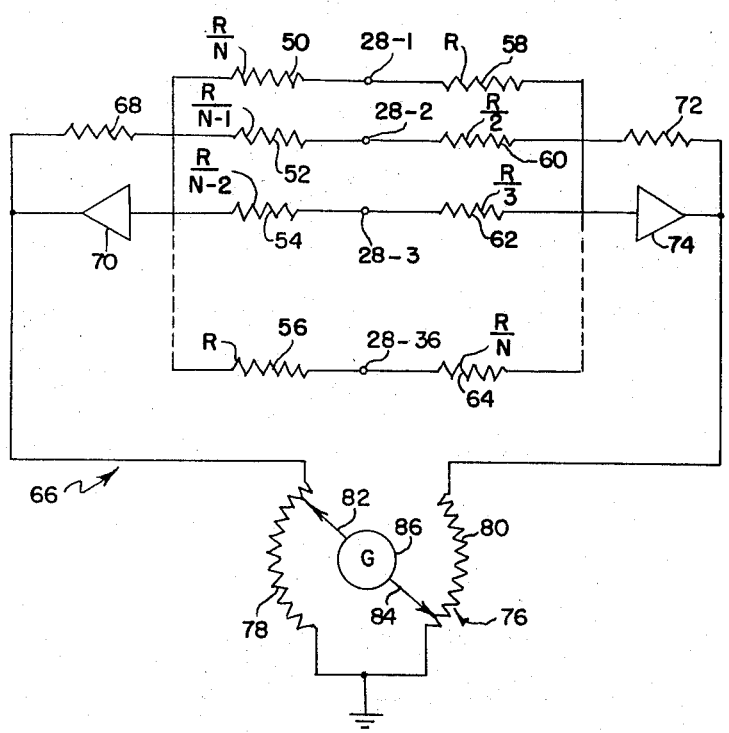
FIGURE 5 is still another embodiment that is capable of being utilized in connection with FIGURE 1.

The technique for manually determining $\bar{x}$ follows immediately: Complementing again variations $k$ and $1-k$ as given, for example, with a two section ganged potentiometer, can be adjusted to give a null response with a resulting $k$ value as read from the potentiometer dial setting yielding the proper centroid value. FIGURE 5 shows the circuitry utilizing active summing. For low impedance summing networks, the ganged potentiometer may be placed directly at the outlets of the summing networks. The circuitry shown in FIGURE 5 has been indicated generally by reference numeral 66 and inasmuch as the same resistors are utilized in this section that have been referred to in circuit 48 of FIGURE 4, the same numerals have been applied thereto. It has, however, been already stated that active summing is utilized in connection with FIGURE 5 and, therefore, the circuitry 66 has been provided with a first resistor 68 in parallel with a summing amplifier 70, these components being at one side of FIGURE 5, and a second resistor 72 in parallel with the second summing amplifier 74, these latter components being shown at the right in FIGURE 5.

Still referring to the circuitry 66 of FIGURE 5, it will be noted that the two-section ganged potentiometer has been designated by the reference numeral 76, having a first resistance section 78 and a second resistance section 80. The first resistance section 78 is connected to the resistor 68 and the amplifier 70, whereas the second resistor section 80 is connected to the resistor 72 and the amplifier 74. The ganging action is derived in this instance by means of two wiper arms 82, 84 which move in unison so as to increase the amount of resistance in the section 78 while concomitantly decreasing the resistance in section 80. Galvanometer 86 serves the purpose of indicating when a null condition has been reached. When meter 86 reads zero, which is the center point of travel for the indicating needle, then the centroid point has been determined with respect to the pattern 40.

Provided that the various voltages $V_1, V_2, V_3 \ldots V_N$ be inverted as to polarity when applied to the resistors 58, 60, 62 and 64, a passive system using a single nulling potentiometer becomes possible. Accordingly, a plurality of inverters 90 are shown in the circuitry 88 of FIGURE 6. The potentiometer has been indicated by the reference numeral 92 and includes a single resistance section 94 and a wiper arm 96 that is connected to a galvanometer 98 which indicates when a null condition has been reached, the null condition in turn establishing the location of the centroid. As will be shown subsequently (FIGURE 7), the set of inverters may be realized with convenience using both positive and negative output loudness converters.

Figure 6:
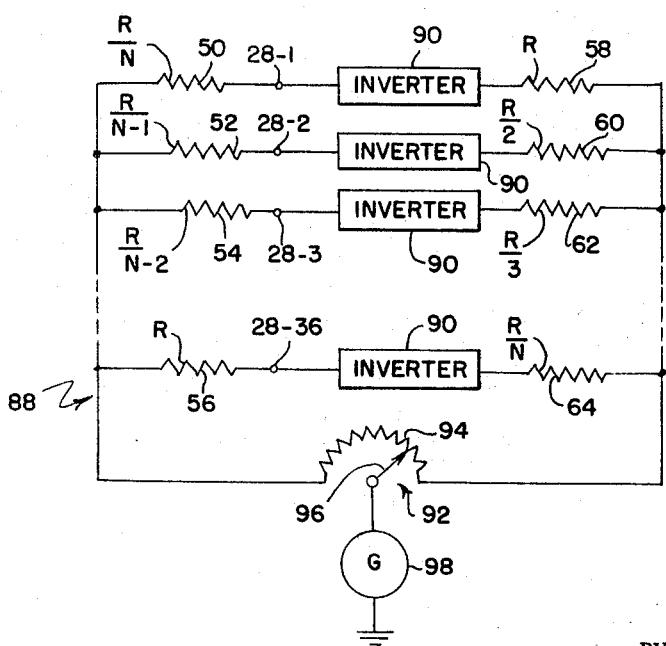
FIGURE 6 is a still further modification of the circuitry that is capable of being substituted in FIGURE 1.

In using either the circuit 66 of FIGURE 5 or the circuit 88 of FIGURE 6, the subject acquires the centroid as follows: He continually views the meter 86 or 98, as the case may be, while producing a sustained sound into the input device 12. The potentiometer 76 or the potentiometer 92, depending on which circuit is being employed, is constantly under the control of the subject while making the desired sustained sound. The subject adjusts the potentiometer until the galvanometer indicates the balanced condition; the resulting reading of the potentiometer gives the centroid.

Another way of using my device, specifically for purposes of speech training, is to set the potentiometer at a previously desired value. A subject produces a sustained sound. By trial and error, he can vary the sound he is producing until the previously desired centroid value is obtained as indicated by a galvanometer reading of zero; the subject knows the direction from the null condition (left or right on the galvanometer) and may correct himself accordingly. Although not herein shown, it will be appreciated that sustained sound test worksheets may be prepared where various voice and relative whisper values are set forth which are representative of the various centroids associated with different sounds. It should be self-evident that the subject may be replaced with an ordinary servomechanism insofar as the function of achieving an accurate potentiometer setting, which nulls the galvanometer, is concerned. Such an automated system is mentioned in order to illustrate the versatility of the invention.

Considering the foregoing description, especially in conjunction with my previously filed patent application, it is believed that sufficient information has been given in order that the invention can be readily practiced. However, it may be of assistance to present a specific system involving what is functionally the equivalent of the analog ear configuration that has been mentioned but differing appreciably as to the structural components employed. The specific system is schematically portrayed in FIGURE 7.

It can be explained that the transfer functions from the entrance of the analog ear cochlea to any one of the loudness converters 26 (including detection or loudness conversion) is characterized by an unsymmetric low-Q resonance curve and a delay. The delay increases as the particular loudness converter in question occurs farther along the transmission line representation for the cochlea from the entrance at the oval window. In actual practice, the electronic analog ear has been compared with a simplified equivalent (FIGURE 7) containing only ten sections which duplicate the transfer functions except for delays. It has been found that centroid values for the common sustained sounds are essentially the same. The area measure also behaves the same in the two alluded to cases. It follows rather directly that, for speech measures of area and centroid, my simplified analog ear system is entirely equivalent to the complete analog ear, even though fewer sections are used. It can also be pointed out that the pattern width measure is similar for the two systems.

The simplified analog ear 10a of FIGURE 7 uses a passive network 100 for the middle ear 22 shown in FIGURE 1, the network being composed of inductors 102, 104 and capacitors 106, 108. The middle ear network 100 drives in common the inputs to ten unsymmetric low-pass filters 111-120, three of which are illustrated. It will be seen that the filter 111 is comprised of the capacitor $C_1$, the inductors $L_1$, $L_1'$ and the resistors 122, 124. These components vary from filter to filter (with the exception of the resistors 122, 124) and have been distinguished by the appropriate subscript.

Each filter 111-120 is terminated in two half-wave detectors 126, 128 which provide a reasonably linear resistive load. The use of two detectors also provides loudness converter output which may be either positive or negative.

Connected to each pair of the detectors 126, 128 (there being a pair for each filter) are resistors $R_1$, $R_1'$-$R_{10}$, $R_{10}'$; the resistors $R_1$-$R_{10}$ constitute one tapered resistor array and the resistors $R_1'$-$R_{10}'$ a second tapered array.

The ten unsymmetric bandpass filters 111-120 have equal center-frequency-to-bandwidth ratios and center frequencies are distributed uniformly along a logarithmic scale starting at 158 c.p.s. and ending at 10,000 c.p.s. All of the filters can be normalized to the same frequency of one radian to obtain the general normalized transfer function $$\frac{Hp^2}{(p+1)([p^2+(2/3)p+1]} \quad (1)$$

where H is a constant and p is the derivative operator. (For a radian center frequency $\omega_0$, p is replaced in the equation with $p/\omega_0$.) It is important in the system of FIGURE 7 that adjacent filters overlap one another in frequency at approximately their half-power points; otherwise an irregular and rippled pass band characteristic may result.

The illustrated filter structure of FIGURE 7 allows the detectors 126, 128 to be employed for direct energization of a nulling galvanometer 130 in a manner corresponding to that hereinbefore described. The potentiometer with which the galvanometer 130 is connected has been labeled 132.

Actual values for the components utilized in the filters 111-120 and the tapered resistor arrays $R_1$-$R_{10}$, $R_1'$-$R_{10}'$ of FIGURE 7 are tabulated below, together with the center frequencies for the ten filters:

| | C.p.s. |
|---|---|
| $f_1$ | 158 |
| $f_2$ | 251 |
| $f_3$ | 399 |
| $f_4$ | 631 |
| $f_5$ | 1,000 |
| $f_6$ | 1,580 |
| $f_7$ | 2,510 |
| $f_8$ | 3,990 |
| $f_9$ | 6,310 |
| $f_{10}$ | 10,000 |

| | µf. |
|---|---|
| $C_1$ | 1.58 |
| $C_2$ | 0.995 |
| $C_3$ | 0.626 |
| $C_4$ | 0.396 |
| $C_5$ | 0.25 |
| $C_6$ | 0.158 |
| $C_7$ | 0.1 |
| $C_8$ | 0.0626 |
| $C_9$ | 0.0396 |
| $C_{10}$ | 0.025 |

| | Mh. |
|---|---|
| $L_1$ | 1,075 |
| $L_2$ | 678 |
| $L_3$ | 426 |
| $L_4$ | 373 |
| $L_5$ | 170 |
| $L_6$ | 107 |
| $L_7$ | 68 |
| $L_8$ | 43 |
| $L_9$ | 27 |
| $L_{10}$ | 17 |
| $L_1'$ | 605 |
| $L_2'$ | 381 |
| $L_3'$ | 239 |
| $L_4'$ | 151 |
| $L_5'$ | 95 |
| $L_6'$ | 60 |
| $L_7'$ | 38 |
| $L_8'$ | 24 |
| $L_9'$ | 15 |
| $L_{10}'$ | 10 |

| | K |
|---|---|
| $R_1$ | 20 |
| $R_2$ | 20/2 |
| $R_3$ | 20/3 |
| $R_4$ | 20/4 |
| $R_5$ | 20/5 |
| $R_6$ | 20/6 |
| $R_7$ | 20/7 |
| $R_8$ | 20/8 |
| $R_9$ | 20/9 |
| $R_{10}$ | 2 |
| $R_1'$ | 2 |
| $R_2'$ | 20/9 |
| $R_3'$ | 20/8 |
| $R_4'$ | 20/7 |
| $R_5'$ | 20/6 |
| $R_6'$ | 20/5 |
| $R_7'$ | 20/4 |
| $R_8'$ | 20/3 |
| $R_9'$ | 20/2 |
| $R_{10}'$ | 20 |

From the foregoing, it will be seen that an exceedingly simple system has been devised which is capable of helping in the study of speech and hearing, and which system can serve as a ready tool for helping in the correction of various detected shortcomings in speech or hearing.

It will, of course, be understood that various changes may be made in the form, details, arrangements and proportions of the parts without departing from the scope of my invention as set forth in the appended claims.

What is claimed:
1. A sound analyzing system comprising:
   (a) means providing an electrical signal representative of a sound to be analyzed;
   (b) a plurality of unsymmetric filters connected to said signal means;
   (c) a detecting means connected to each of said filters;
   (d) an impedance means connected to each of said detecting means, and
   (e) means connected across all of said impedance means for providing an output signal which is the sum of the signals from each of said detecting and impedance means for providing an indication of the pattern activity of said sound.

2. A sound analyzing system in accordance with claim 1 in which said respective impedance means collectively constitute:
   (a) a pair of tapered resistor arrays connected at one side to said detecting means and at their other side to said last-mentioned means.

3. A sound analyzing system comprising:
   (a) means for converting a speech sound into an input electrical signal;

(b) circuit means connected to said converting means including an array of stations simulating various spaced points along the basilar membrane of an animal cochlea for providing a plurality of output electrical signals at said stations representative of motions of spaced points;

(c) means for converting said output signals into voltage signals having a relatively slowly varying waveform, and (d) means connected to said last-mentioned means for summing said voltage signals to provide an indication of the pattern activity of said sound.

4. A system in accordance with claim 3 in which said summing means includes:
   (a) an impedance network.

5. A system in accordance with claim 4 in which said network includes:
   (a) a resistor connected to said last-mentioned means for each of said output signals.

6. A system in accordance with claim 5 in which:
   (a) the resistors of said network are tapered linearly.

7. A sound analyzing system comprising:
   (a) an input device for producing a transduced electrical signal from a sound to be analyzed;
   (b) means connected to said input device including an analog cochlea circuit having a network of impedance sections simulating spaced points along the basilar membrane of an animal cochlea for providing a plurality of electrical signals varying in accordance with said transduced electrical signal and the particular values of said impedance sections to thus represent motions occurring at said spaced points;
   (c) a plurality of loudness converters for amplifying, detecting and filtering said plurality of electrical signals to produce relatively slowly varying waveforms on a spatial basis;
   (d) a first group of linearly tapered summing resistors, one resistor thereof being connected at one end to each of said converters;
   (e) a second group of linearly tapered summing resistors, one resistor thereof also being connected at one end of each of said loudness converters;
   (f) said first and second groups of resistors varying inversely in value from each other;
   (g) respective means joining the other ends of each of said groups of resistors together;
   (h) resistance means connected to said respective means, and
   (i) adjustable means for determining a null condition on said resistance means.

8. A sound analyzing system comprising:
   (a) means providing an electrical signal representative of a sound to be analyzed;
   (b) a plurality of unsymmetric filters connected to said signal means;
   (c) detecting means connected to said filters;
   (d) impedance means connected to said detecting means, and
   (e) measuring means connected across said impedance means for providing a visual indication of the pattern activity of said sound,
   (f) said impedance means including a pair of tapered resistor arrays connected at one side to said detecting means and at their other side to said measuring means,
   (g) said measuring means including a potentiometer connected across said other sides of said tapered resistor arrays and a meter for determining when said potentiometer has been moved into a null position.

9. A system in accordance with claim 8 in which:
   (a) the resistors of said arrays are tapered linearly.

10. A sound analyzing system comprising:
    (a) means providing an electrical signal representative of a sound to be analyzed;
    (b) a plurality of unsymmetric filters connected to said signal means, the adjacent filters of said plurality of filters overlapping one another in frequency at approximately their half-power points;
    (c) a detecting means connected to each of said filters;
    (d) an impedance means connected to each of said detecting means, and
    (e) measuring means connected across all of said impedance means for providing a visual indication of the pattern activity of said sound.

11. A sound analyzing system comprising:
    (a) means providing an electrical signal representative of a sound to be analyzed;
    (b) a plurality of unsymmetric filters connected to said signal means;
    (c) a detecting means connected to each of said filters;
    (d) a resistor connected at one end to each of said detecting means, each of said resistors being of the same value, and
    (e) means connected to the other end of each of said resistors for providing a signal that is the sum of the output electrical signals from said sum signal being proportional to the area under the envelope formed by said output signals and hence a measure of the pattern activity of said sound.

12. A sound analyzing system comprising:
    (a) means providing an electrical signal representative of a sound to be analyzed;
    (b) a plurality of unsymmetric filters connected to said signal means;
    (c) a detecting means connected to each of said filters;
    (d) a tapered resistor array including a plurality of resistors connected at one end to said respective detecting means, and
    (e) means connected to the other ends of said resistors for providing a signal which is the sum of the output electrical signals from said resistors, said sum signal being proportional to the centroid of the area under the envelope formed by said output signals and hence a measure of the pattern activity of said sound.

References Cited

UNITED STATES PATENTS 3,097,349   7/1963   Putzrath et al. _____ 179—1
3,113,187   12/1963   Flanagan _____ 179—1

KATHLEEN H. CLAFFY, *Primary Examiner.*

R. MURRAY, *Assistant Examiner.*